US011454980B2

(12) United States Patent
Takeda et al.

(10) Patent No.: US 11,454,980 B2
(45) Date of Patent: Sep. 27, 2022

(54) MANAGEMENT SYSTEM FOR WORK VEHICLE AND MANAGEMENT METHOD FOR WORK VEHICLE

(71) Applicant: Komatsu Ltd., Tokyo (JP)

(72) Inventors: Koji Takeda, Tokyo (JP); Akiharu Nishijima, Tokyo (JP)

(73) Assignee: Komatsu LTD., Tokyo (JP)

( * ) Notice: Subject to any disclaimer, the term of this patent is extended or adjusted under 35 U.S.C. 154(b) by 319 days.

(21) Appl. No.: 16/317,610

(22) PCT Filed: Sep. 21, 2017

(86) PCT No.: PCT/JP2017/034144
§ 371 (c)(1),
(2) Date: Jan. 14, 2019

(87) PCT Pub. No.: WO2018/056371
PCT Pub. Date: Mar. 29, 2018

(65) Prior Publication Data
US 2019/0227565 A1    Jul. 25, 2019

(30) Foreign Application Priority Data
Sep. 23, 2016   (JP) .............................. JP2016-186327

(51) Int. Cl.
*G05D 1/02*   (2020.01)
*G05D 1/00*   (2006.01)

(52) U.S. Cl.
CPC ......... *G05D 1/0238* (2013.01); *G05D 1/0088* (2013.01); *G05D 1/02* (2013.01); *G05D 2201/021* (2013.01)

(58) Field of Classification Search
CPC ...... G05D 1/0238; G05D 1/02; G05D 1/0088; G05D 2201/021; G05D 1/0297;
(Continued)

(56) References Cited

U.S. PATENT DOCUMENTS 6,292,725 B1   9/2001   Kageyama et al.
6,539,294 B1   3/2003   Kageyama
(Continued)

FOREIGN PATENT DOCUMENTS

CA   2923683 A1   6/2015
CA   2938940 A1   9/2015
(Continued)

OTHER PUBLICATIONS

Office Action dated Dec. 24, 2019, issued for the corresponding Australian patent application No. 2017332935.
(Continued)

*Primary Examiner* — Rami Khatib
(74) *Attorney, Agent, or Firm* — Locke Lord LLP

(57) ABSTRACT

A management system for a work vehicle, includes: a traveling condition data generation unit configured to set traveling condition data including a first traveling route for making a work vehicle travel with forward movement and a second traveling route for making the work vehicle travel with backward movement, in a conveying path leading to a workplace where an operation of the work vehicle is performed; a specific area data acquisition unit configured to acquire specific area data indicating a specific area where the work vehicle is able to switch back in the conveying path; and a switchback command unit configured to output a command signal for switching back the work vehicle traveling on one of the first traveling route and the second traveling route at the specific area, and making the work vehicle travel on the other of the first traveling route and the second traveling route.

13 Claims, 9 Drawing Sheets

(58) Field of Classification Search
CPC ...... G05D 1/0278; E02F 9/2054; E02F 9/205; E02F 9/262; E02F 3/00; E21F 13/00
See application file for complete search history.

(56) References Cited

U.S. PATENT DOCUMENTS

| | | | |
|---|---|---|---|
| 2009/0043439 A1* | 2/2009 | Barfoot | G05D 1/0297 |
| | | | 701/25 |
| 2010/0076640 A1* | 3/2010 | Maekawa | G05D 1/0217 |
| | | | 701/26 |
| 2011/0022276 A1 | 1/2011 | Thaduvayi et al. | |
| 2012/0016576 A1* | 1/2012 | Huang | G06Q 10/00 |
| | | | 701/423 |
| 2013/0325208 A1 | 12/2013 | Osagawa et al. | |
| 2014/0107849 A1 | 4/2014 | Tojima et al. | |
| 2016/0046306 A1 | 2/2016 | Miyajima | |
| 2016/0223350 A1 | 8/2016 | Lewis et al. | |
| 2016/0224026 A1 | 8/2016 | Hamada et al. | |
| 2016/0282874 A1 | 9/2016 | Kurata et al. | |
| 2016/0342915 A1* | 11/2016 | Humphrey | G05D 1/0297 |
| 2017/0227366 A1* | 8/2017 | Laur | G01C 21/32 |
| 2017/0336218 A1* | 11/2017 | Beaurepaire | G08G 1/167 |
| 2018/0356821 A1* | 12/2018 | Kentley-Klay | G01C 21/3415 |
| 2021/0339768 A1* | 11/2021 | Kakkar | G06V 20/56 |
| 2021/0341933 A1* | 11/2021 | Kakkar | G01C 21/20 |

FOREIGN PATENT DOCUMENTS

| | | |
|---|---|---|
| CA | 2893194 A1 | 1/2016 |
| JP | S543710 A | 1/1979 |
| JP | H02-096809 A | 4/1990 |
| JP | H0944250 A | 2/1997 |
| JP | H9319433 A | 12/1997 |
| JP | H11-143534 A | 5/1999 |
| JP | 2006190237 A | 7/2006 |
| JP | 2006-300268 A | 11/2006 |
| JP | 2007-078532 A | 3/2007 |
| JP | 2008-097632 A | 4/2008 |
| JP | 2010-073080 A | 4/2010 |
| JP | 2012-113429 A | 6/2012 |
| JP | 2013004023 A | 1/2013 |
| JP | 2015067243 * | 4/2015 |
| JP | 2015067243 A | 4/2015 |
| JP | 2015-123778 A | 7/2015 |
| JP | 2016-037978 A | 3/2016 |
| WO | 98/45765 A1 | 10/1998 |
| WO | 2014/155733 A1 | 10/2014 |
| WO | 2015087430 A1 | 6/2015 |
| WO | 2016/021293 A1 | 2/2016 |
| WO | 2016/051526 A1 | 4/2016 |
| WO | WO-2016051526 A1 * | 4/2016 ............... G05D 1/02 |

OTHER PUBLICATIONS

International Search Report dated Nov. 28, 2017, issued for PCT/JP2017/034144.
Office Action dated Nov. 21, 2019, issued for the corresponding Canadian patent application No. 3,031,473.
Japanese Office Action dated May 18, 2021 for related Japanese Patent Application No. 2019-222405, 2 pages.
Japanese Office Action dated Mar. 23, 2021 in corresponding Japanese Patent Application No. 2019-222405.
Japanese Patent Office Decision of Refusal dated Aug. 10, 2021 for corresponding Japanese Patent Application No. 2019-222405.
Japanese Patent Office Decision to Grant dated Dec. 14, 2021 for Japanese Patent Application No. 2019-222405, 2 pages.
Chinese Office Action dated Jul. 11, 2022 in corresponding Chinese Patent Application No. 201780045127.7, 7 pages. (No Translation).
Digital Highway Application Technical Manual with English translation, dated Apr. 30, 2009, 7 pages.

* cited by examiner

MANAGEMENT SYSTEM FOR WORK VEHICLE AND MANAGEMENT METHOD FOR WORK VEHICLE

FIELD

The present invention relates to a management system for a work vehicle and a management method for a work vehicle.

BACKGROUND

In a wide-area work site like a mine, a work vehicle traveling unmanned is used for transportation work. After a load is loaded at a loading place, the work vehicle travels on a conveying path to move to a discharging place and discharges the load at the discharging place. Patent Literature 1 discloses a technique in which a work vehicle changes the front and rear direction of the work vehicle at a loading place and moves to a loading point.

CITATION LIST

Patent Literature

Patent Literature 1: Japanese Laid-Open Patent Application No. 2012-113429

SUMMARY

Technical Problem

For example, although an abnormality occurs in a first loading place of a plurality of loading places and it is difficult to perform intended work in the first loading place, if the work vehicle travels toward the first loading place, productivity of a work site will decrease. In order to suppress the decrease in the productivity of the work site when the abnormality occurs in the first loading place, a technique has been required that allows the work vehicle to quickly travel to a normal second loading place.

An aspect of the present invention is to provide a management system for a work vehicle and a management method for a work vehicle capable of suppressing decrease in productivity of a work site.

Solution to Problem

According to a first aspect of the present invention, a management system for a work vehicle, comprises: a traveling condition data generation unit configured to set traveling condition data including a first traveling route for making a work vehicle travel with forward movement and a second traveling route for making the work vehicle travel with backward movement, in a conveying path leading to a workplace where an operation of the work vehicle is performed; a specific area data acquisition unit configured to acquire specific area data indicating a specific area where the work vehicle is able to switch back in the conveying path; and a switchback command unit configured to output a command signal for switching back the work vehicle traveling on one of the first traveling route and the second traveling route at the specific area, and making the work vehicle travel on the other of the first traveling route and the second traveling route.

According to a second aspect of the present invention, a management method for a work vehicle, comprises: setting traveling condition data including a first traveling route for making a work vehicle travel with forward movement and a second traveling route for making the work vehicle travel with backward movement, in a conveying path leading to a workplace where an operation of the work vehicle is performed; acquiring specific area data indicating a specific area where the work vehicle is able to switch back in the conveying path; and outputting a command signal for switching back the work vehicle traveling on one of the first traveling route and the second traveling route at the specific area, and making the work vehicle travel on the other of the first traveling route and the second traveling route.

Advantageous Effects of Invention

According to an aspect of the present invention, there is provided a management system for a work vehicle and a management method for a work vehicle capable of suppressing decrease in productivity of a work site.

DESCRIPTION OF EMBODIMENTS

Hereinafter, an embodiment of the present invention will be described with reference to the drawings; however, the present invention is not limited thereto. The constituent elements of the embodiment described below can be appropriately combined. In addition, some constituent elements may not be used.

[Management System]

Figure 1:
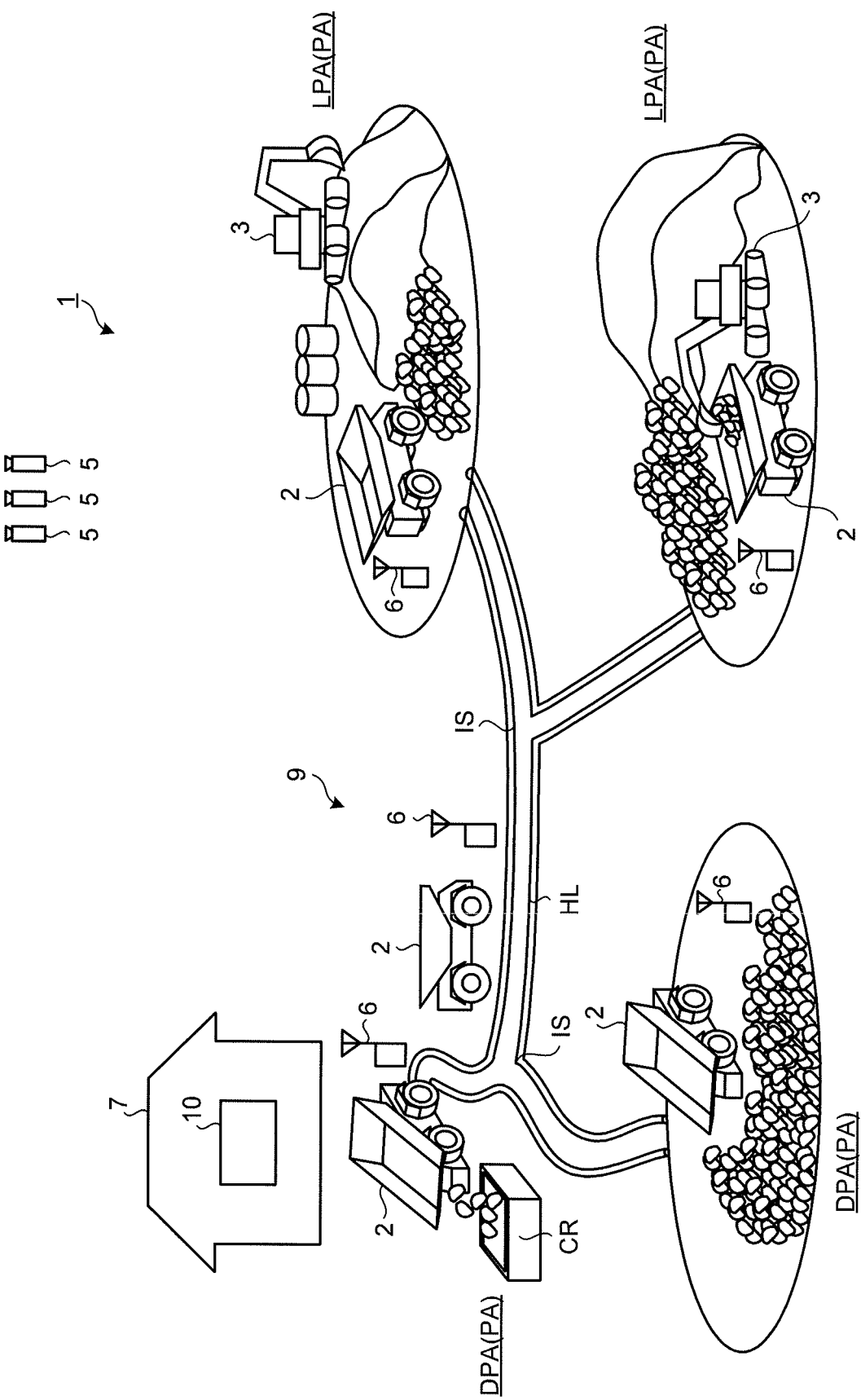
FIG. 1 is a diagram schematically illustrating one example of a management system for a work vehicle according to an embodiment.

FIG. 1 is a diagram schematically illustrating one example of a management system 1 for a work vehicle 2 according to an embodiment. The management system 1 implements operation management of the work vehicle 2. In the present embodiment, the work vehicle 2 is a dump truck 2 that is a transport vehicle capable of traveling through a mine.

As illustrated in FIG. 1, the dump truck 2 travels in at least a part of a mine workplace PA and a conveying path HL leading to the workplace PA. The workplace PA includes at least one of a loading place LPA and a discharging place DPA. The conveying path HL includes an intersection IS.

The dump truck 2 travels according to a target traveling route set in the conveying path HL and the workplace PA.

The loading place LPA is an area where a loading operation of loading a load onto the dump truck 2 is performed. In the loading place LPA, a loading machine 3 such as an excavator operates. The discharging place DPA is an area where a discharge operation of discharging the load from the dump truck 2 is performed. For example, a crusher CR is provided in the discharging place DPA.

The management system 1 includes a management apparatus 10 and a communication system 9. The management apparatus 10 includes a computer system and is installed in a control facility 7 provided in the mine. The communication system 9 performs data communication and signal communication between the management apparatus 10 and the dump truck 2. The communication system 9 has a plurality of repeaters 6 that relays data and signals. The management apparatus 10 and the dump truck 2 wirelessly communicate with each other via the communication system 9.

In the present embodiment, the dump truck 2 is an unmanned dump truck traveling through the mine based on a command signal from the management apparatus 10. The dump truck 2 travels through the mine based on the command signal from the management apparatus 10 without depending on the operator's operation.

In the present embodiment, a position of the dump truck 2 is detected using a global navigation satellite system (GNSS). The global navigation satellite system includes a global positioning system (GPS). The GNSS has a plurality of positioning satellites 5. The GNSS detects a position defined by latitude, longitude, and altitude coordinate data. The position detected by the GNSS is an absolute position defined in the global coordinate system. By the GNSS, the absolute position of the dump truck 2 at the mine is detected.

[Dump Truck]

Figure 2:
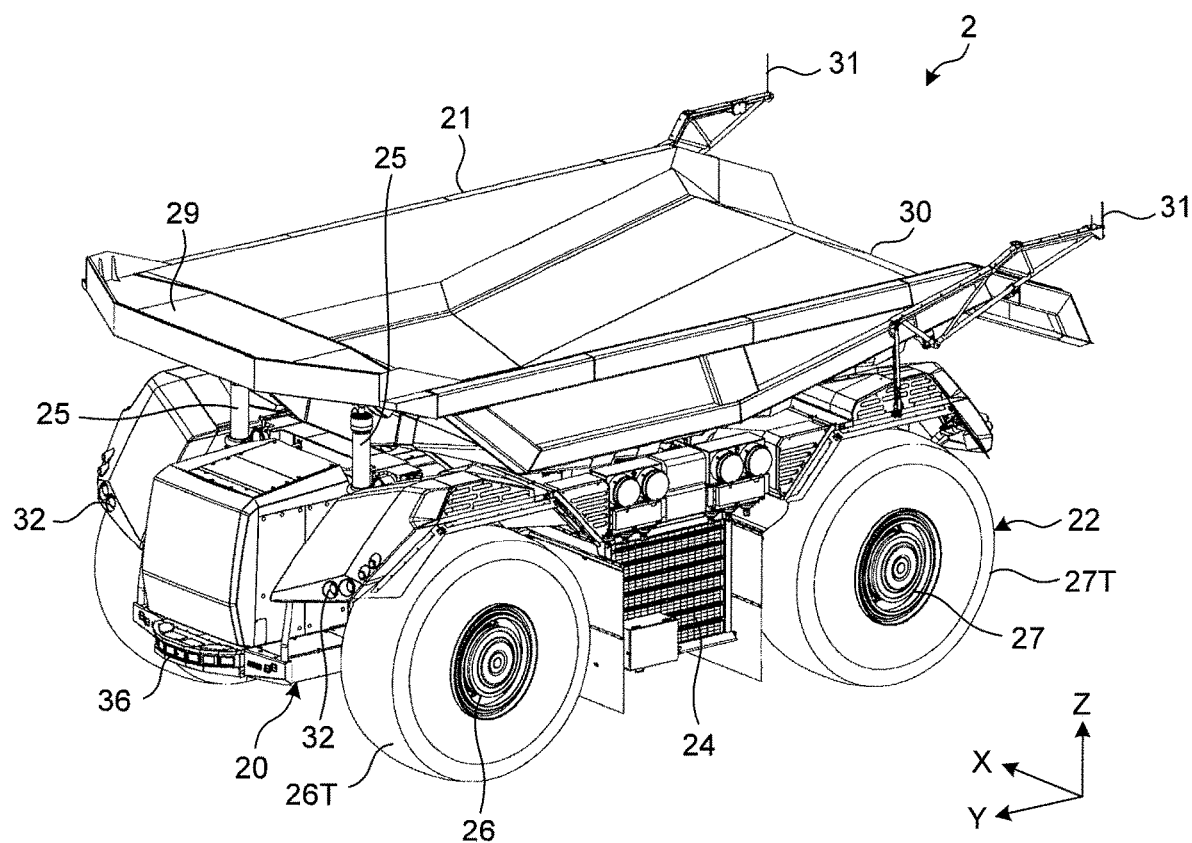
FIG. 2 is a perspective view of the work vehicle according to the present embodiment as viewed from the front.
Figure 3:
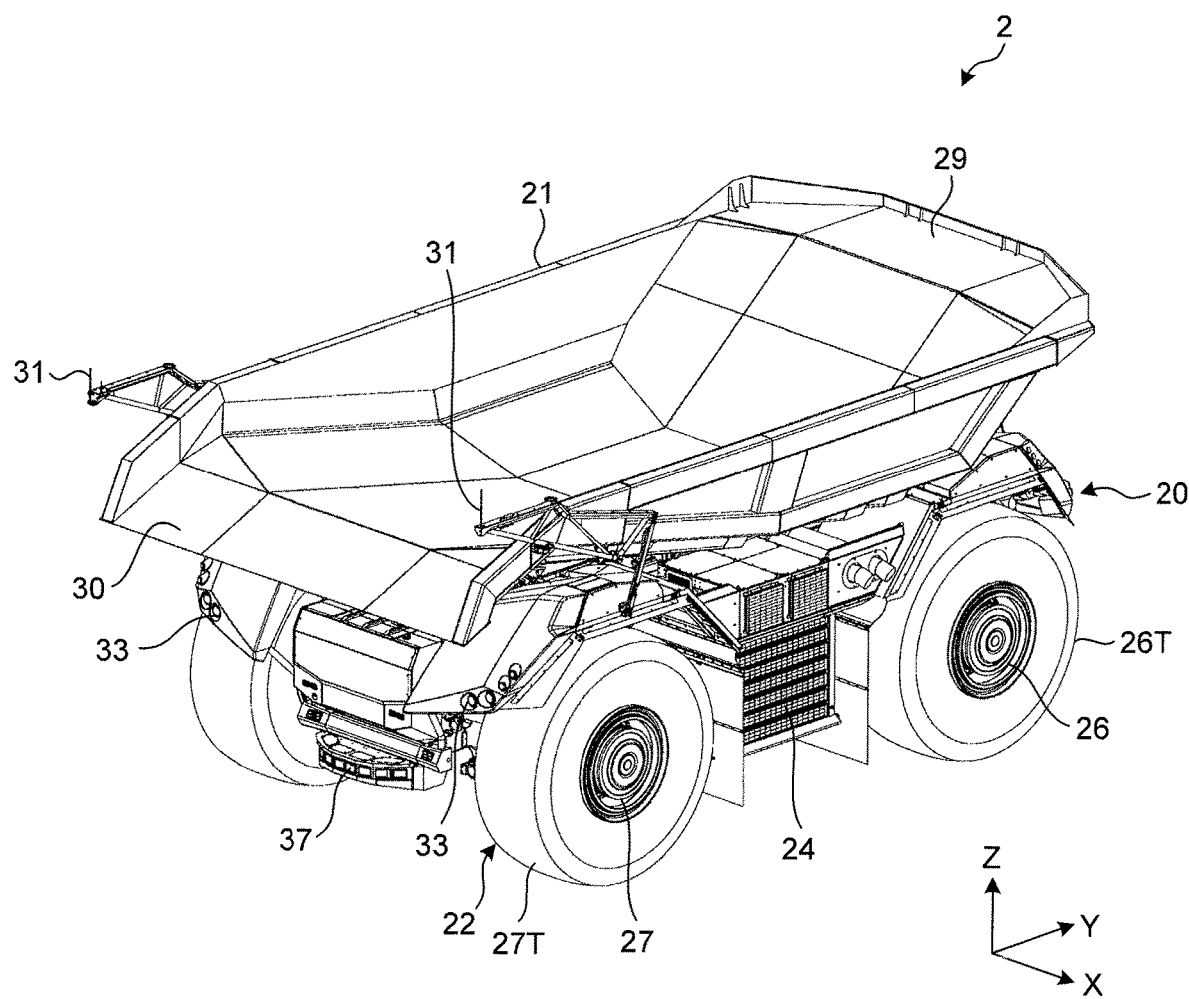
FIG. 3 is a perspective view of the work vehicle according to the present embodiment as viewed from the rear.
Figure 4:
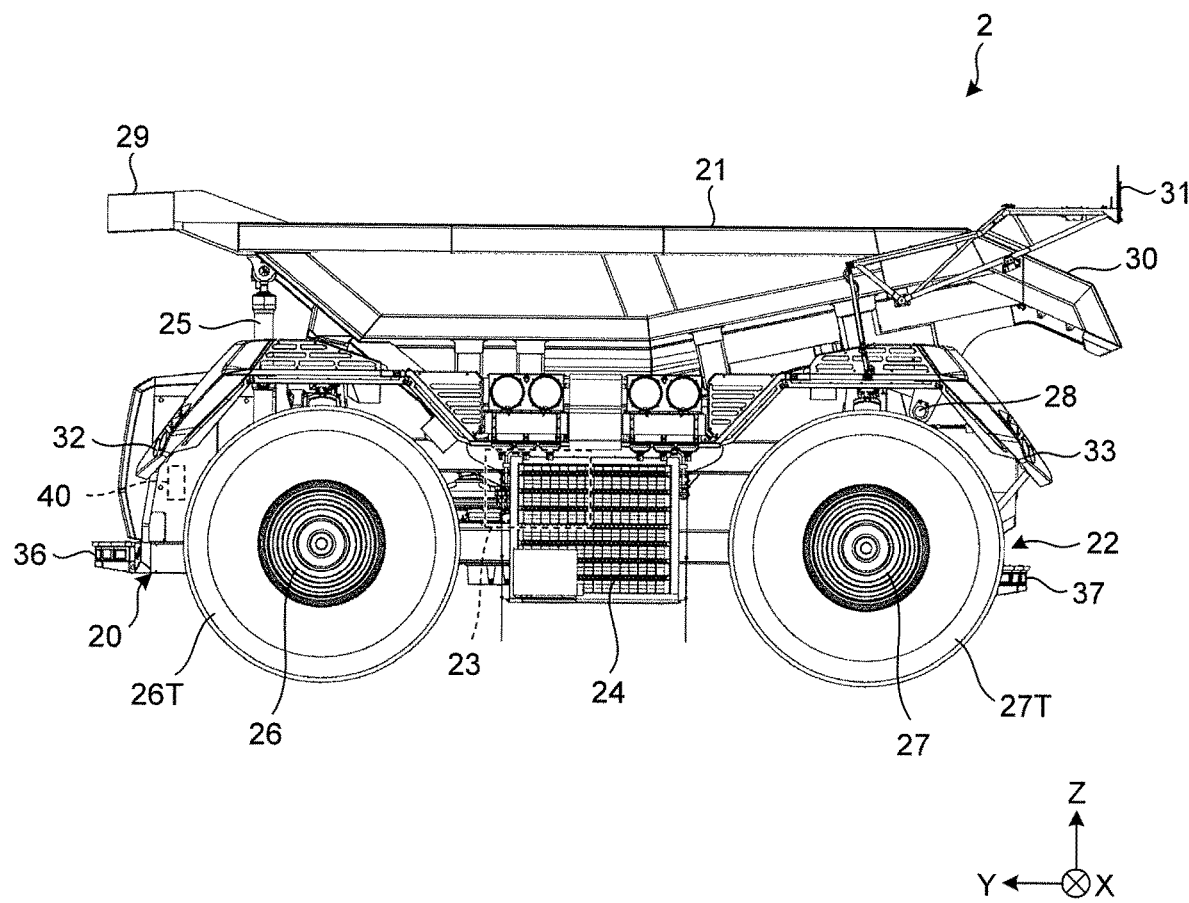
FIG. 4 is a side view illustrating the work vehicle according to the present embodiment.

Next, the dump truck 2 according to the present embodiment will be described. FIG. 2 is a perspective view of the dump truck 2 according to the present embodiment as viewed from the front. FIG. 3 is a perspective view of the dump truck 2 according to the present embodiment as viewed from the rear. FIG. 4 is a side view illustrating the dump truck 2 according to the present embodiment. In explanation using FIGS. 2, 3, and 4, the XYZ orthogonal coordinate system is set and the positional relationship of each part will be described with reference to the XYZ orthogonal coordinate system.

In the explanation using FIGS. 2, 3, and 4, the Y-axis direction is defined as a traveling direction of the dump truck 2, the +Y direction is defined as a forward movement direction of the dump truck 2, and the −Y direction is defined as a backward movement direction of the dump truck 2. Furthermore, in the traveling direction, a portion or a direction on the +Y side of the dump truck 2 is appropriately referred to as a front portion or a front side, and a portion or a direction on the −Y side of the dump truck 2 is appropriately referred to as a rear portion or a rear side. Furthermore, the X-axis direction is defined as a vehicle width direction of the dump truck 2, and in the vehicle width direction, a portion or a direction on the +X side of the dump truck 2 is appropriately referred to as a right portion or a right side, and a portion or a direction on the −X side of the dump truck 2 is appropriately referred to as a left portion or a left side. Furthermore, the Z-axis direction is defined as a longitudinal direction of the dump truck 2, and in the longitudinal direction, a portion or a direction on the +Z side of the dump truck 2 is appropriately referred to as an upper portion or an upper side, and a portion or a direction on the −Z side of the dump truck 2 is appropriately referred to as a lower portion or a lower side.

The dump truck 2 includes a chassis 20, a dump body 21 supported by the chassis 20, a traveling device 22 that supports the chassis 20, a drive device 23 that generates motive power for operating the traveling device 22, a radiator 24, a hoist cylinder 25 that drives the dump body 21, and a control apparatus 40.

In the present embodiment, the dump truck 2 is a cabless dump truck having no cab (operation cab). The dump truck 2 travels unmanned without depending on the operator's operation. The dump truck 2 may be a dump truck having a cab and traveling unmanned.

The traveling device 22 has a wheel 26 provided at the front portion of the dump truck 2 and supporting a tire 26T, a wheel 27 provided at the rear portion of the dump truck 2 and supporting a tire 27T, a brake device configured to brake the wheel 26 and the wheel 27, and a steering device configured to steer the wheel 26 and the wheel 27. One wheel 26 and one tire 26T are provided for each of the right portion and the left portion of the chassis 20. One wheel 27 and one tire 27T are provided for each of the right portion and the left portion of the chassis 20.

The wheel 26 and the wheel 27 are supported by the chassis 20 via a suspension. As the wheel 26 and the wheel 27 rotate, the dump truck 2 travels.

The drive device 23 generates motive power for rotating the wheel 26 and the wheel 27. In the present embodiment, the drive device 23 includes an internal combustion engine, a generator that generates electric power by operation of the internal combustion engine, and an electric motor that operates based on the electric power generated by the generator. The radiator 24 radiates heat from coolant of the internal combustion engine.

The wheel 26 and the wheel 27 are rotated by motive power generated by the electric motor. The electric motor is an in-wheel motor and is provided for each of the wheel 26 and the wheel 27. When the internal combustion engine is driven, the generator operates to generate the electric power. The electric motor is driven by the electric power generated by the generator. The electric motor is provided for each of the two wheels 26. Furthermore, the electric motor is provided for each of the two wheels 27. That is, in the present embodiment, the traveling device 22 is a four-wheel drive type traveling device.

The wheel 26 is steered by a first steering device. The wheel 27 is steered by a second steering device. That is, in the present embodiment, the traveling device 22 is a four-wheel steering type traveling device.

The dump truck 2 is movable forward and backward. It is preferable that the traveling performance of the dump truck 2 at the time of forward movement is substantially identical to the traveling performance of the dump truck 2 at the time of backward movement. That is, at least one of the driving performance, the braking performance, and the swinging performance of the traveling device 22 at the time of forward movement is substantially identical to at least one of the driving performance, the braking performance, and the swinging performance of the traveling device 22 at the time of backward movement. For example, the maximum traveling speed of the dump truck 2 at the time of forward movement is substantially identical to the maximum traveling speed of the dump truck 2 at the time of backward movement. The maximum acceleration of the dump truck 2 at the time of forward movement is substantially identical to the maximum acceleration of the dump truck 2 at the time of backward movement.

The dump body 21 accommodates the load. The dump body 21 is rotatably supported at the rear portion of the chassis 20 via a hinge mechanism 28. The dump body 21 has a protrusion 29 at the front portion and an inclined surface 30 at the rear portion.

The hoist cylinder 25 drives the dump body 21. Two hoist cylinders 25 are provided in the vehicle width direction. An upper end of the hoist cylinder 25 is rotatably connected to the front portion of the dump body 21. A lower end of the hoist cylinder 25 is rotatably connected to the chassis 20.

The dump body 21 dumps by the operation of the hoist cylinder 25. As the hoist cylinder 25 extends, the dump body 21 rotates around the hinge mechanism 28 such that the front portion of the dump body 21 rises. As the dump body 21 dumps, the load loaded on the dump body 21 is discharged from the rear portion of the dump body 21.

The control apparatus 40 includes a computer system. The control apparatus 40 controls the dump truck 2 based on a command signal including traveling condition data supplied from the management apparatus 10.

The dump truck 2 has a position detector 31 that detects the absolute position of the dump truck 2, an illumination lamp 32 provided at the front portion, an illumination lamp 33 provided at the rear portion, an obstacle sensor 36 provided at the front portion, and an obstacle sensor 37 provided at the rear portion.

The position detector 31 includes a GPS antenna that receives a GPS signal from the positioning satellite 5 and a GPS calculator that calculates the absolute position of the dump truck 2 based on the GPS signal received by the GPS antenna. The GPS antenna of the position detector 31 is provided at the rear portion of the dump body 21.

The illumination lamp 32 illuminates an object ahead of the dump truck 2. The illumination lamp 33 illuminates an object behind the dump truck 2.

The obstacle sensor 36 detects an obstacle ahead of the dump truck 2 when the dump truck 2 moves forward. The obstacle sensor 37 detects an obstacle behind the dump truck 2 when the dump truck 2 moves backward. The obstacle sensor 36 and the obstacle sensor 37 include, for example, a radar device. Noted that the obstacle sensor 36 and the obstacle sensor 37 may include a laser scanner or a camera. When the obstacle sensor 36 detects an obstacle at the time of forward movement of the dump truck 2, the control apparatus 40 performs processing for preventing a collision between the dump truck 2 and the obstacle, based on detection data of the obstacle sensor 36. When the obstacle sensor 37 detects an obstacle at the time of backward movement of the dump truck 2, the control apparatus 40 performs processing for preventing a collision between the dump truck 2 and the obstacle, based on detection data of the obstacle sensor 37. The processing for preventing a collision between the dump truck 2 and an obstacle is, for example, processing of decelerating or stopping the traveling dump truck 2.

[Management Apparatus and Control Apparatus]

Figure 5:
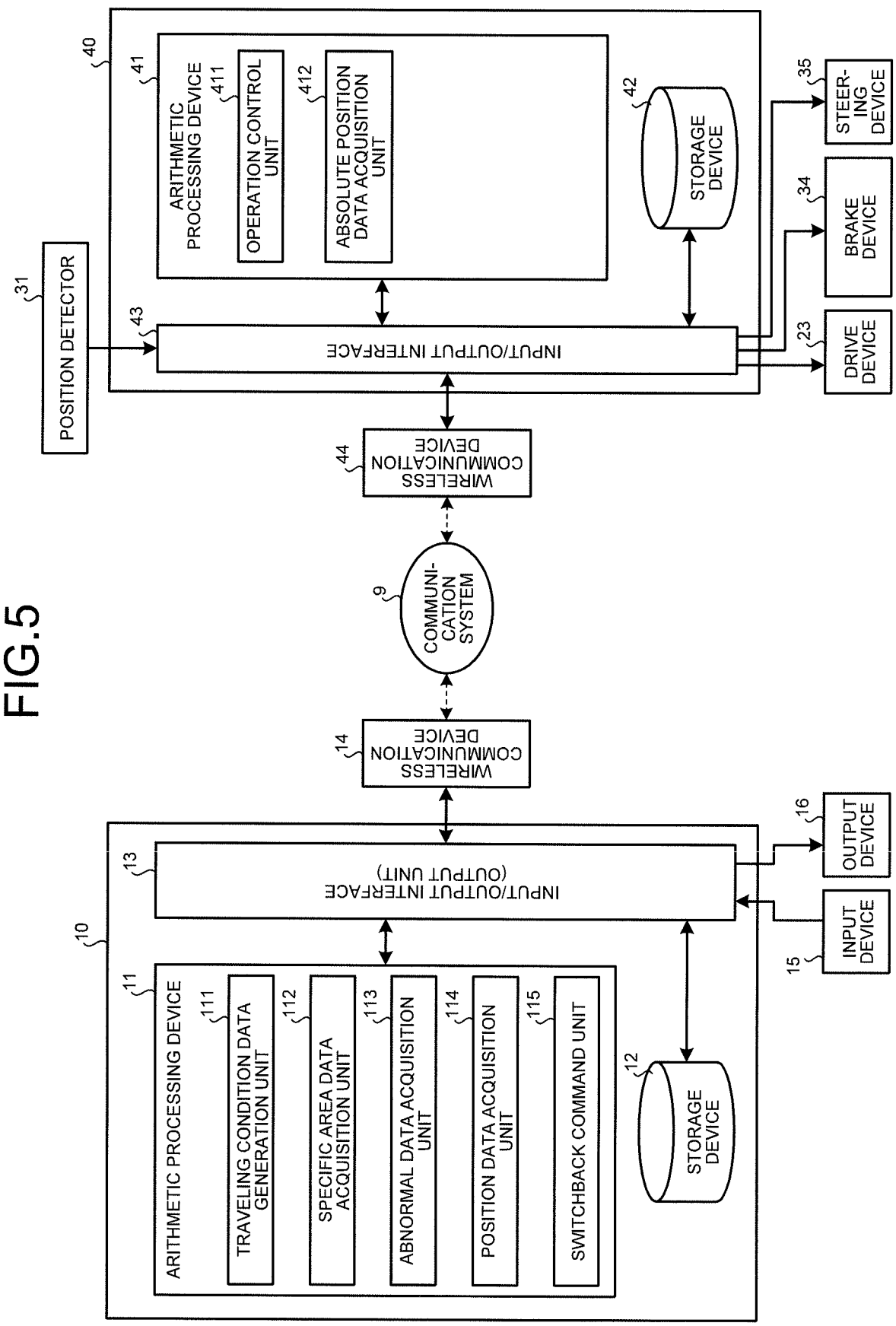
FIG. 5 is a functional block diagram illustrating one example of a management apparatus and a control apparatus according to the present embodiment.

Next, the management apparatus 10 and the control apparatus 40 according to the present embodiment will be described. FIG. 5 is a functional block diagram illustrating one example of the management apparatus 10 and the control apparatus 40 according to the present embodiment. As described above, the management apparatus 10 is installed in the control facility 7. The control apparatus 40 is mounted on the dump truck 2. The management apparatus 10 and the control apparatus 40 wirelessly communicate with each other via the communication system 9.

The management apparatus 10 includes a computer system. The management apparatus 10 has an arithmetic processing device 11 including a processor such as a central processing unit (CPU), a storage device 12 including a memory and storage such as a read only memory (ROM) or a random access memory (RAM), and an input/output interface 13.

The management apparatus 10 is connected to a wireless communication device 14. The management apparatus 10 performs data communication with the dump truck 2 via the wireless communication device 14 and the communication system 9.

The management apparatus 10 is connected to an input device 15 and an output device 16. The input device 15 and the output device 16 are installed in the control facility 7. The input device 15 includes at least one of a keyboard, a mouse, and a touch panel for a computer, for example. Input data generated by operating the input device 15 is output to the management apparatus 10. The output device 16 includes a display device. The display device includes a flat panel display such as a liquid crystal display (LCD) or an organic electroluminescence display (OELD). The output device 16 operates based on display data output from the management apparatus 10. The output device 16 may be, for example, a printer.

The arithmetic processing device 11 has a traveling condition data generation unit 111, a specific area data acquisition unit 112, an abnormal data acquisition unit 113, a position data acquisition unit 114, and a switchback command unit 115.

The traveling condition data generation unit 111 generates traveling condition data of the dump truck 2 traveling through the mine. The traveling condition data of the dump truck 2 includes at least one of a traveling route, a traveling speed, acceleration, deceleration, and a moving direction of the dump truck 2. In addition, the traveling condition data of the dump truck 2 may include at least one of a stopping position and a departure position of the dump truck 2.

In the present embodiment, the traveling condition data generation unit 111 sets traveling condition data including at least a first traveling route RPa for making the dump truck 2 travel with forward movement and a second traveling route RPb for making the dump truck 2 travel with backward movement in the conveying path HL.

It is preferable that the traveling condition data generation unit 111 generates the traveling condition data such that the first traveling route RPa and the second traveling route RPb do not overlap with each other in the workplace PA and the conveying path HL.

The specific area data acquisition unit 112 acquires specific area data indicating a specific area SA where the dump truck 2 can switch back in the conveying path HL.

The switchback is an operation in which the dump truck 2 moving forward changes the moving direction to start moving backward without changing the front and rear direction of the dump truck 2, or an operation in which the dump truck 2 moving backward changes the moving direction to start moving forward without changing the front and rear direction of the dump truck 2. In the present embodiment, the forward movement means traveling with the front portion of the dump truck 2 facing the moving direction. In the present embodiment, the backward movement means traveling with the rear portion of the dump truck 2 facing the moving direction.

In the conveying path HL, a plurality of specific areas SA where the dump truck 2 can switch back is provided. The conditions of the specific area SA where the dump truck 2 can switch back include a condition that an area is enough to pass the dump truck 2 traveling in one direction and the dump truck 2 traveling in the opposite direction each other and an area has no obstacle that interrupts the switchback, for example. Examples of the specific area SA include the conveying path HL and an intersection area including the intersection IS of the conveying path HL.

The specific area data includes position data of the specific area SA in the global coordinate system and dimensional data of the specific area SA. The specific area data is known data derived from a preliminary survey or a field survey at the mine and is stored in the storage device 12. The specific area data acquisition unit 112 acquires the specific area data from the storage device 12.

An administrator of the control facility 7 may designate the specific area SA via the input device 15. The input device 15 generates the specific area data by being operated by the administrator. In this case, the specific area data acquisition unit 112 acquires the specific area data from the input device 15. For example, in a case where the input device 15 includes a touch panel provided on the output device (display device) 16, the administrator of the control facility 7 may designate the specific area SA for switching back the dump truck 2, by touching any position of the conveying path HL while referring to map data of the mine displayed on the display device 16.

The abnormal data acquisition unit 113 acquires abnormal data of the workplace PA. The abnormal data of the workplace PA includes abnormal data of the loading place LPA and abnormal data of the discharging place DPA. The abnormal data of the loading place LPA includes, for example, an abnormality of the loading machine 3. The abnormality of the loading machine 3 includes failure or malfunction of the loading machine 3. The abnormal data of the discharging place DPA includes, for example, an abnormality of a crusher DR. The abnormality of the crusher DR includes failure or malfunction of the crusher DR.

The abnormal data of the workplace PA is transmitted from the workplace PA to the management apparatus 10 via the communication system 9. The abnormal data acquisition unit 113 acquires the abnormal data of the workplace PA via the communication system 9. For example, in a case where an abnormality occurs in the loading machine 3, abnormal data of the loading machine 3 is transmitted from the loading machine 3 to the management apparatus 10 via the communication system 9. In a case where an abnormality occurs in the crusher DR, abnormal data of the crusher DR is transmitted from the crusher DR to the management apparatus 10 via the communication system 9.

The position data acquisition unit 114 acquires position data indicating the absolute position of the dump truck 2. As described above, the absolute position of the dump truck 2 is detected by the position detector 31. Detection data of the position detector 31 is transmitted to the management apparatus 10 via the communication system 9. The position data acquisition unit 114 acquires the position data of the dump truck 2 via the communication system 9.

The switchback command unit 115 outputs, to the dump truck 2, a command signal for switching back, at the specific area SA, the dump truck 2 traveling on one of the first traveling route RPa and the second traveling route RPb set in the conveying path HL, and making the dump truck 2 travel on the other traveling route of the first traveling route RPa and the second traveling route RPb.

The input/output interface 13 outputs the traveling condition data generated by the traveling condition data generation unit 111 to the dump truck 2. Furthermore, the input/output interface 13 outputs the command signal output from the switchback command unit 115 to the dump truck 2. The input/output interface 13 functions as an output unit that outputs the traveling condition data and the command signal to the dump truck 2. The traveling condition data and the command signal generated by the arithmetic processing device 11 are output to the dump truck 2 via the input/output interface 13 and the communication system 9.

The control apparatus 40 includes the computer system. The control apparatus 40 has an arithmetic processing device 41 including a processor such as a central processing unit (CPU), a storage device 42 including a memory and storage such as a read only memory (ROM) or a random access memory (RAM), and an input/output interface 43.

The control apparatus 40 is connected to a wireless communication device 44. The control apparatus 40 performs data communication with the management apparatus 10 via the wireless communication device 44 and the communication system 9.

The control apparatus 40 is connected to the position detector 31, the drive device 23, a brake device 34, and a steering device 35. The position detector 31, the drive device 23, the brake device 34, and the steering device 35 are mounted on the dump truck 2.

As described above, the position detector 31 detects the absolute position of the dump truck 2. The drive device 23 operates in order to drive the traveling device 22 of the dump truck 2. The brake device 34 operates in order to brake the traveling device 22 of the dump truck 2. The steering device 35 operates in order to steer the traveling device 22 of the dump truck 2.

The arithmetic processing device 41 has an operation control unit 411 and an absolute position data acquisition unit 412.

The operation control unit 411 outputs an operation control signal for controlling at least one of the drive device 23, the brake device 34, and the steering device 35 of the dump truck 2, based on the traveling condition data supplied from the management apparatus 10. The operation control signal includes an accelerator command signal output to the drive device 23, a brake command signal output to the brake device 34, and a steering command signal output to the steering device 35.

The absolute position data acquisition unit 412 acquires the absolute position data of the dump truck 2 from the detection data of the position detector 31.

[Traveling Condition Data]

Figure 6:
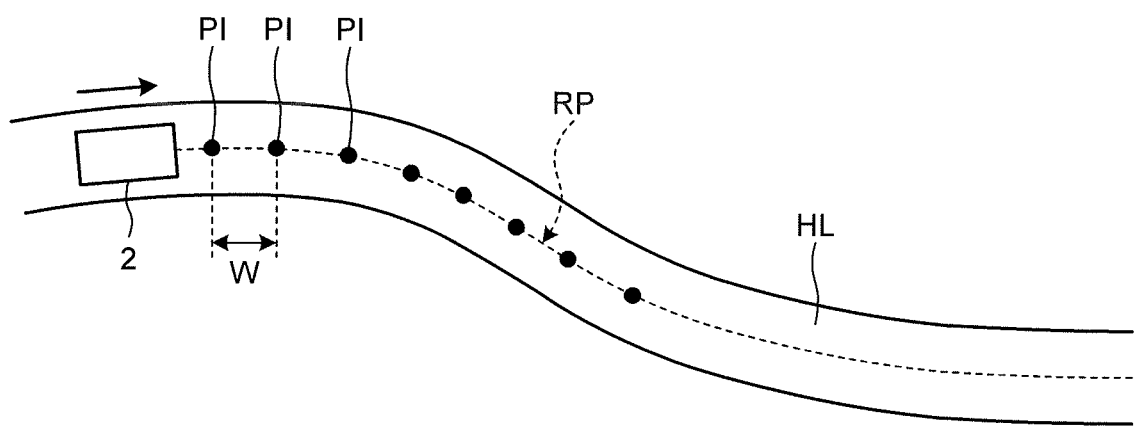
FIG. 6 is a diagram schematically illustrating traveling condition data according to the present embodiment.

Next, the traveling condition data according to the present embodiment will be described. FIG. 6 is a diagram schematically illustrating the traveling condition data according to the present embodiment. FIG. 6 illustrates one example of the traveling condition data defined in the conveying path HL.

As illustrated in FIG. 6, the traveling condition data includes an aggregate of a plurality of course points PI set at a constant interval W.

Each of the plurality of course points PI includes target absolute position data of the dump truck 2, target traveling speed data of the dump truck 2 at the position where the course point PI is set, and target moving direction data of the dump truck 2 at the position where the course point PI is set.

A target traveling route RP of the dump truck 2 is defined by a trajectory passing through the plurality of course points PI. The target traveling speed of the dump truck 2 at the position where the course point PI is set is defined based on the target traveling speed data. The target moving direction of the dump truck 2 at the position where the course point PI is set is defined based on the target moving direction data.

FIG. 6 illustrates one example of the traveling condition data set in the conveying path HL. In the workplace PA, the traveling condition data of the dump truck 2 is also set.

[Management Method]

Figure 7:
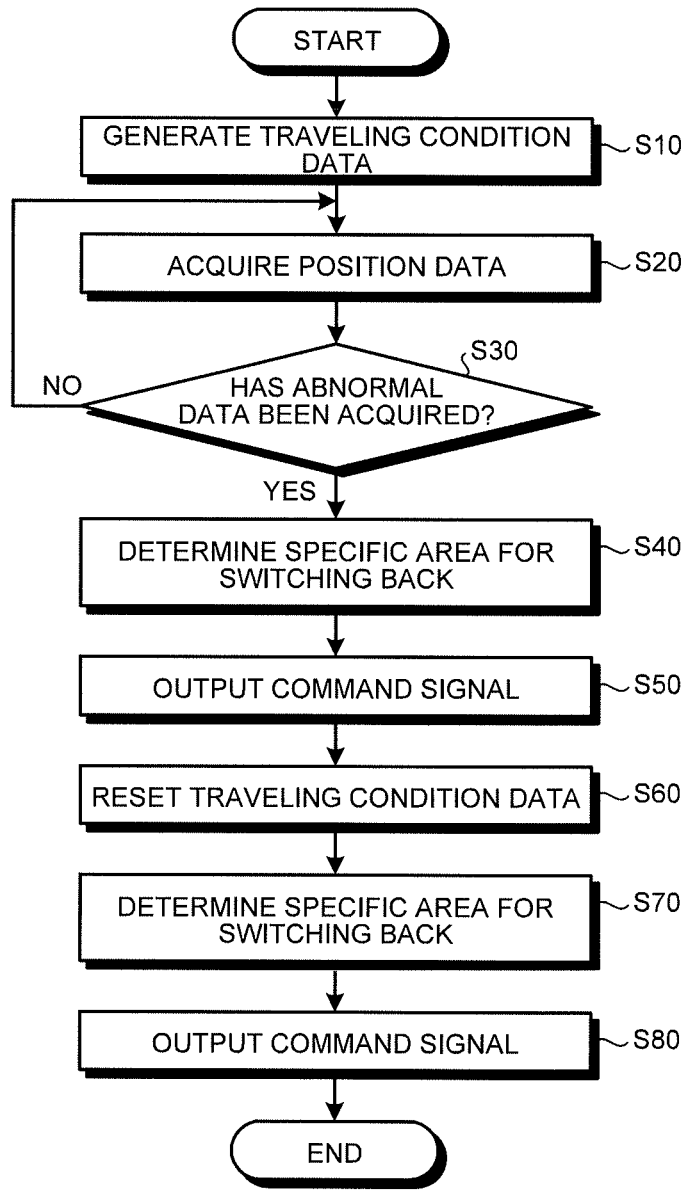
FIG. 7 is a flowchart illustrating one example of a management method for a work vehicle according to the present embodiment.
Figure 8:
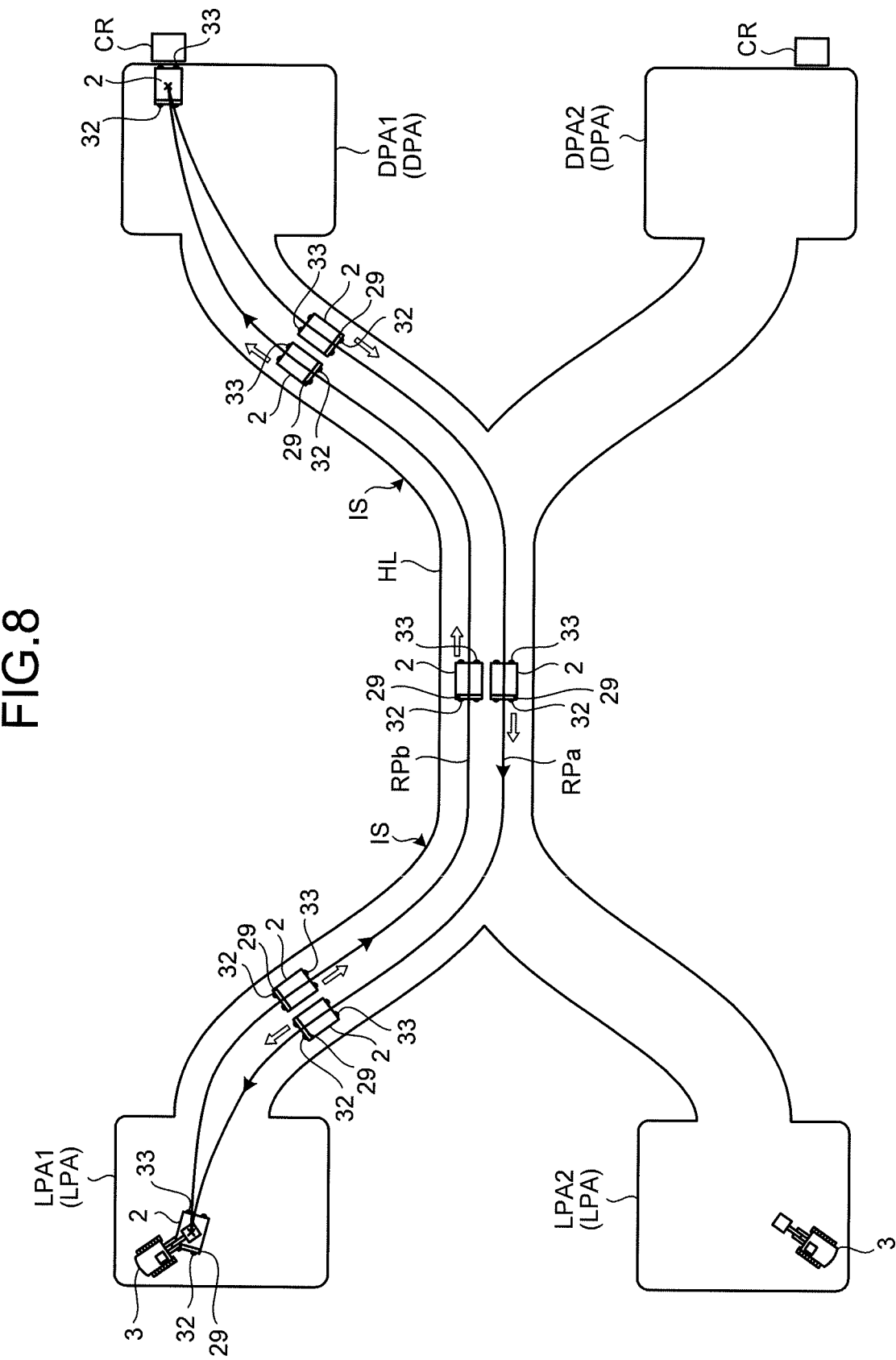
FIG. 8 is a schematic diagram for explaining the management method for a work vehicle according to the present embodiment.
Figure 9:
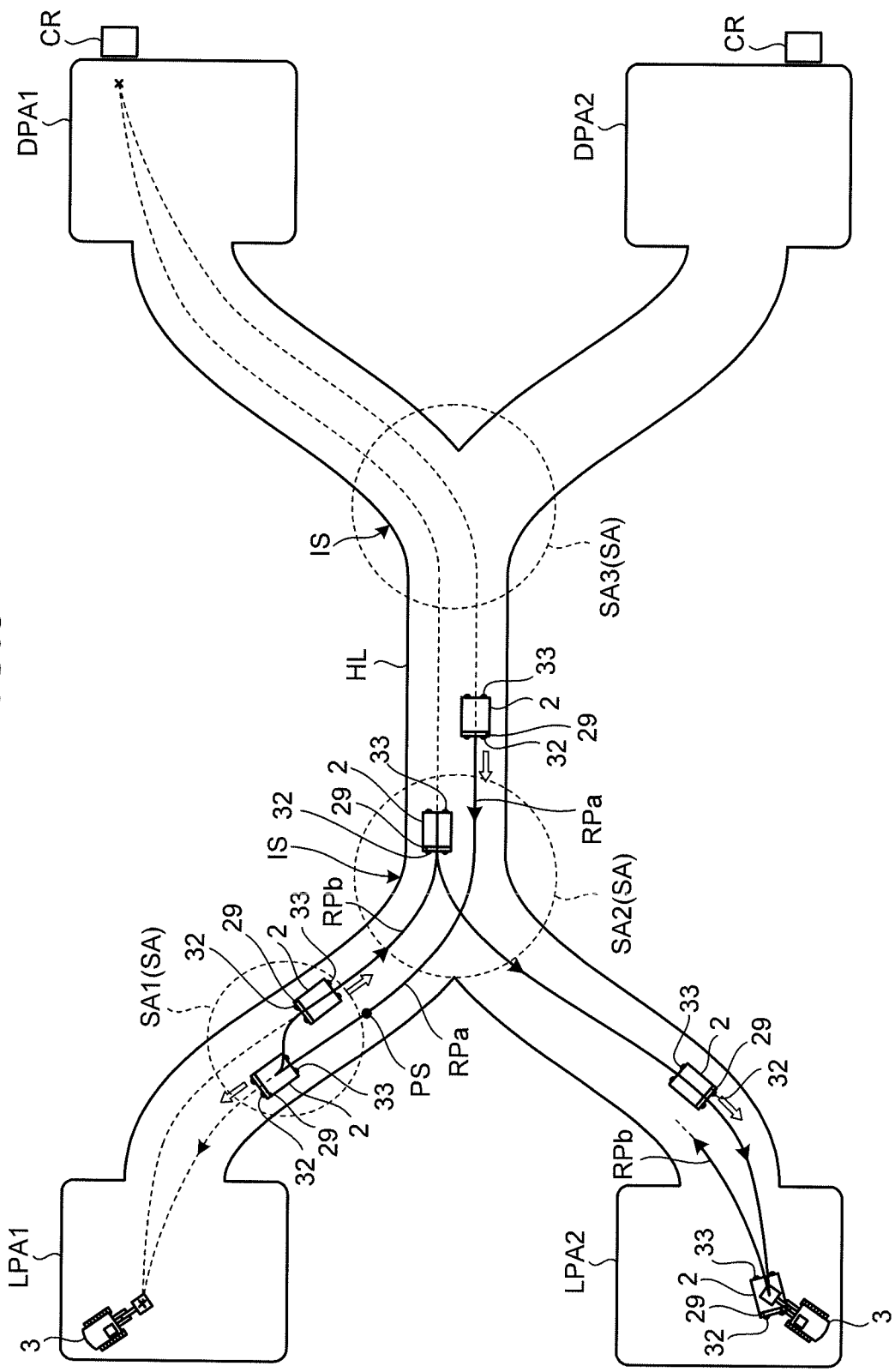
FIG. 9 is a schematic diagram for explaining the management method for a work vehicle according to the present embodiment.

Next, a management method for the dump truck 2 according to the present embodiment will be described. FIG. 7 is a flowchart illustrating one example of the management method for the dump truck 2 according to the present embodiment. FIGS. 8 and 9 are schematic diagrams for explaining the management method for the dump truck 2 according to the present embodiment.

In the conveying path HL leading to the loading place LPA where the loading operation of the dump truck 2 is performed and the discharging place DPA where the discharge operation of the dump truck 2 is performed, the traveling condition data generation unit 111 sets the traveling condition data including the first traveling route RPa for making the dump truck 2 travel with forward movement and the second traveling route RPb for making the dump truck 2 travel with backward movement (step S10).

FIG. 8 illustrates one example of the traveling condition data according to the present embodiment. In the example illustrated in FIG. 8, a plurality of loading places LPA and a plurality of discharging places DPA are provided in the mine. In the example illustrated in FIG. 8, a first loading place LPA1 and a second loading place LPA2 are provided in the mine. In addition, a first discharging place DPA1 and a second discharging place DPA2 are provided in the mine.

As illustrated in FIG. 8, the first traveling route RPa for making the dump truck 2 travel with forward movement and the second traveling route RPb for making the dump truck 2 travel with backward movement are set in the conveying path HL. The dump truck 2 travels on the conveying path HL according to the first traveling route RPa and the second traveling route RPb.

FIG. 8 illustrates an example in which the traveling condition data is set such that the dump truck 2 travels back and forth between the first loading place LPA1 and the first discharging place DPA1. When the loading place LPA and the discharging place DPA are in a normal state, the dump truck 2 travels with forward movement on the conveying path HL according to the first traveling route RPa and enters the first loading place LPA1. In the first loading place LPA1, the dump truck 2 is loaded with a load by the loading machine 3. After the loading operation in the first loading place LPA1 is completed, the dump truck 2 travels with backward movement on the conveying path HL according to the second traveling route RPb and enters the first discharging place DPA1. The dump truck 2 discharges the load in the first discharging place DPA1. After the discharge operation in the first discharging place DPA1 is completed, the dump truck 2 travels with forward movement on the conveying path HL according to the first traveling route RPa and enters the first loading place LPA1. In the first loading place LPA1, the dump truck 2 is loaded with a load by the loading machine 3. Subsequently, the same operation is repeated.

The position data of the dump truck 2 is monitored by the management apparatus 10. The position data acquisition unit 114 acquires the position data of the dump truck 2 (step S20).

The abnormal data acquisition unit 113 determines whether the abnormal data of the loading place LPA and the discharging place DPA has been acquired (step S30).

In step S30, if it is determined that the abnormal data has not been acquired (step S30: No), the processing returns to step S20 and the monitoring of the position data of the dump truck 2 is continued.

In step S30, if it is determined that the abnormal data has been acquired (step S30: Yes), the specific area data acquisition unit 112 acquires, from the storage device 12, the specific area data indicating the specific area SA where the dump truck 2 can switch back in the conveying path HL.

FIG. 9 schematically illustrates the traveling condition data when an abnormality occurs in the first loading place LPA1. For example, when the abnormal data of the first loading place LPA1 is acquired by the abnormal data acquisition unit 113 while the dump truck 2 is traveling on the conveying path HL toward the first loading place LPA1, the switchback command unit 115, based on the position data of the dump truck 2, determines the specific area SA for switching back the dump truck 2 from the plurality of specific areas SA acquired by the specific area data acquisition unit 112 (step S40).

As illustrated in FIG. 9, the plurality of specific areas SA where the dump truck 2 can switch back is provided in the conveying path HL. FIG. 9 illustrates an example in which a first specific area SA1, a second specific area SA2, and a third specific area SA3 are provided in the conveying path HL. The second specific area SA2 and the third specific area SA3 include the intersection IS. The position and number of the specific areas SA illustrated in FIG. 9 is one example.

For example, in a case where the abnormal data acquisition unit 113 acquires the abnormal data of the first loading place LPA1 at a time when the dump truck 2 traveling on the conveying path HL toward the first loading place LPA1 has passed through a position PS, the switchback command unit 115, based on position data indicating the position PS of the dump truck 2, switches back the dump truck 2 at a specific area SA closest to the dump truck 2 among the plurality of specific areas SA.

In the example illustrated in FIG. 9, the specific area SA closest to the position PS is the first specific area SA1. Based on the position data of the dump truck 2, the switchback command unit 115 determines the specific area SA for switching back the dump truck 2, as the first specific area SA1, from the plurality of specific areas SA such that the dump truck 2 switches back at the first specific area SA1.

The switchback command unit 115 outputs, to the dump truck 2, a command signal for switching back the dump truck 2 traveling on the first traveling route RPa at the first specific area SA1, and making the dump truck 2 travel on the second traveling route RPb (step S50).

As a result, as illustrated in FIG. 9, the dump truck 2 switches back at the first specific area SA1 and travels backward on the second traveling route RPb.

In the present embodiment, when the first loading place LPA1 is abnormal, the traveling condition data generation unit 111 resets the traveling condition data of the dump truck 2 such that the dump truck 2 travels toward the normal second loading place LPA2 (step S60).

Based on the position data of the dump truck 2 and the position data of the second loading place LPA2, the switchback command unit 115 determines a specific area SA for switching back the dump truck 2 from the plurality of specific areas SA acquired by the specific area data acquisition unit 112 such that the dump truck 2 travels toward the second loading place LPA2 (step S70).

The position data indicating the absolute position of the second loading place LPA2 is known data and is stored in the storage device 12. Based on the position data of the dump truck 2 acquired by the position data acquisition unit 114 and the position data of the second loading place LPA2 stored in the storage device 12, the switchback command unit 115 determines the specific area SA from the plurality of specific areas SA for switching back the dump truck 2 in order to make the dump truck 2 travel toward the second loading place LP2.

In the present embodiment, the switchback command unit 115 switches back the dump truck 2 at a specific area SA closest to the second loading place LPA2 among the plurality of specific areas SA. In the example illustrated in FIG. 9, the specific area SA closest to the second loading place LPA2 is the second specific area SA2. Based on the position data of the second loading place LPA2, the switchback command unit 115 determines the specific area SA for switching back the dump truck 2, as the second specific area SA2, from the plurality of specific areas SA such that the dump truck 2 switches back at the second specific area SA2.

The switchback command unit 115 outputs, to the dump truck 2, a command signal for switching back the dump truck 2 traveling on the second traveling route RPb, at the second specific area SA2, and making the dump truck 2 travel on the first traveling route RPa (step S80).

As a result, as illustrated in FIG. 9, the dump truck 2 switches back at the second specific area SA2, and travels forward on the first traveling route RPa. The dump truck 2 switching back at the second specific area SA2 and traveling forward on the first traveling route RPa can enter the second loading place LPA2.

In this way, in the present embodiment, the dump truck 2 can enter the second loading place LPA2 as a destination by switching back a plurality of times in the conveying path HL.

In the abnormal state of the first loading place LPA1, the traveling condition data generation unit 111 sets the traveling condition data such that the dump truck 2 travels back and forth between the second loading place LPA2 and the first discharging place DPA1.

The administrator of the control facility 7 can appropriately change the destination of the dump truck 2 by operating the input device 15.

In the present embodiment, one example of the management method for the dump truck 2 when the abnormality occurs in the first loading place LPA1 has been described. The above management method can also be applied to, for example, the dump truck 2 when an abnormality occurs in the first discharging place DPA1.

For example, when the abnormal data of the first discharging place DPA1 is acquired by the abnormal data acquisition unit 113 while the dump truck 2 is traveling with backward movement on the second traveling route RPb toward the first discharging place DPA1, based on the position data of the dump truck 2, the switchback command unit 115 outputs a command signal for switching back the dump truck 2 at a specific area SA closest to the dump truck 2 among the plurality of specific areas SA. As a result, the dump truck 2 traveling backward on the second traveling route RPb toward the first discharging place DPA1 switches back, and travels forward on the first traveling route RPa.

Furthermore, when the first discharging place DPA1 is abnormal, the traveling condition data generation unit 111 resets the traveling condition data of the dump truck 2 such that the dump truck 2 travels toward the normal second discharging place DPA2. Based on the position data of the dump truck 2 and the position data of the second discharging place DPA2, the switchback command unit 115 determines the specific area SA where the dump truck 2 switches back from the plurality of specific areas SA acquired by the specific area data acquisition unit 112 such that the dump truck 2 travels toward the second discharging place DPA2.

The position data indicating the absolute position of the second discharging place DPA2 is known data and is stored in the storage device 12. Based on the position data of the dump truck 2 acquired by the position data acquisition unit 114 and the position data of the second discharging place DPA2 stored in the storage device 12, the switchback command unit 115 determines the specific area SA from the plurality of specific areas SA for switching back the dump truck 2 in order to make the dump truck 2 travel toward the second discharging place DP2. The switchback command unit 115 outputs, to the dump truck 2, a command signal for switching back the dump truck 2 traveling on the first traveling route RPa at the specific area SA, and making the dump truck 2 travel on the second traveling route RPb.

As a result, the dump truck 2 switches back at the specific area SA and travels backward on the second traveling route RPb. The dump truck 2 switching back at the specific area SA and traveling backward on the second traveling route RPb can enter the second discharging place DPA2.

[Action and Effect]

As described above, according to the present embodiment, the dump truck 2 where the traveling performance at the time of forward movement is substantially identical to the traveling performance at the time of backward movement can switch back at the specific area SA of the conveying path HL after traveling on one of the first traveling route RPa and the second traveling route RPb, and travel on the other one of the first traveling route RPa and the second traveling route RPb.

Thus, for example, in a case where the abnormality occurs in the first loading place LPA1 among the plurality of loading places LPA and it is difficult to perform intended work in the first loading place LPA1, it is possible to make the dump truck 2 travel quickly toward the normal second loading place LPA2 without making the dump truck 2 travel toward the first loading place LPA1. As a result, the loading operation is performed normally in the second loading place LPA2, and decrease in productivity of the mine is suppressed.

According to the present embodiment, the dump truck 2 is the four-wheel steering type, so that the wheel 26 or the wheel 27 ahead in the moving direction are steered even at the time of forward movement and at the time of backward movement. In addition, the traveling performance of the dump truck 2 at the time of forward movement is substantially identical to the traveling performance of the dump truck 2 at the time of backward movement. Furthermore, the obstacle sensor 36 is provided in the front portion of the dump truck 2 and the obstacle sensor 37 is provided in the rear portion of the dump truck 2. Consequently, even when an abnormality occurs in the loading place LPA, the dump truck 2 can easily change its direction in the conveying path HL without traveling to the loading place LPA where the abnormality has occurred. Therefore, even when the abnormality occurs in the loading place LPA, it is possible to shorten a time required for changing the direction of the dump truck 2 as compared with a conventional case. Therefore, it is possible to suppress the decrease in the productivity of the mine. Furthermore, since the dump truck 2 can change its direction without traveling to the loading place LPA, unnecessary traveling is suppressed, and fuel consumption can be reduced.

Furthermore, since the dump truck 2 does not have to switch back, uneven wear of the tire 26T and the tire 27T is suppressed, and the life of the tire 26T and the tire 27T is improved. Furthermore, in the present embodiment, since the dump truck 2 can switch back in the conveying path HL, it is not necessary to enlarge an area of the loading place LPA.

Furthermore, in the present embodiment, a first switchback is performed at the specific area SA closest to the dump truck 2 among the plurality of specific areas SA. Thus, it is possible to shorten a period of time while the dump truck 2 travels toward the first loading place LPA1 in the abnormal state, for example. Furthermore, in the present embodiment, a second switchback is performed at the specific area SA closest to the second loading place LPA2 in the normal state. As a result, the dump truck 2 can arrive at the second loading place LPA2 at an early stage.

In the above embodiment, when a specific dump truck 2 among a plurality of dump trucks 2 traveling on the conveying path HL is switched back, the switchback command unit 115 may switch back the specific dump truck 2 among the plurality of dump trucks 2 at a specific area SA having the longest time while another dump truck 2 enters, among the plurality of specific areas SA. In general, in a mine, the plurality of dump trucks 2 travels on the conveying path HL according to the traveling condition data. The position data acquisition unit 114 acquires the position data of each of the plurality of dump trucks 2. Based on the position data of each of the plurality of dump trucks 2, the position data acquisition unit 114 can determine which specific area SA is crowded with the dump trucks 2 and which specific area SA is vacant among the plurality of specific areas SA. When switching back the specific dump truck 2, the switchback command unit 115 can determine a vacant specific area SA that is not crowded with the dump trucks 2 and switch back the dump truck 2 at the determined specific area SA. As a result, traveling of the other dump trucks 2 is not hindered, and the decrease in the productivity of the mine is suppressed.

In the above embodiment, the functions of the traveling condition data generation unit 111, the specific area data acquisition unit 112, the abnormal data acquisition unit 113, the position data acquisition unit 114, and the switchback command unit 115 are included in the management apparatus 10. A part or all of the functions of the traveling condition data generation unit 111, the specific area data acquisition unit 112, the abnormal data acquisition unit 113, the position data acquisition unit 114, and the switchback command unit 115 may be included in the control apparatus 40 mounted on the dump truck 2.

In the above embodiment, it is assumed that the work vehicle is the dump truck 2 operating in the mine. The work vehicle may operate in a wide area work site separate from the mine.

DESCRIPTION OF REFERENCE NUMERALS

1 MANAGEMENT SYSTEM
2 DUMP TRUCK (WORK VEHICLE)
3 LOADING MACHINE
5 POSITIONING SATELLITE
6 REPEATER
7 CONTROL FACILITY
9 COMMUNICATION SYSTEM
10 MANAGEMENT APPARATUS
11 ARITHMETIC PROCESSING DEVICE
12 STORAGE DEVICE
13 INPUT/OUTPUT INTERFACE
14 WIRELESS COMMUNICATION DEVICE
15 INPUT DEVICE
16 OUTPUT DEVICE
20 CHASSIS
21 DUMP BODY
22 TRAVELING DEVICE
23 DRIVE DEVICE
24 RADIATOR
25 HOIST CYLINDER
26 WHEEL
26T TIRE
27 WHEEL
27T TIRE
28 HINGE MECHANISM
29 PROTRUSION
30 INCLINED SURFACE
31 POSITION DETECTOR
32 ILLUMINATION LAMP
33 ILLUMINATION LAMP
34 BRAKE DEVICE
35 STEERING DEVICE
36 OBSTACLE SENSOR
37 OBSTACLE SENSOR
40 CONTROL APPARATUS
41 ARITHMETIC PROCESSING DEVICE
42 STORAGE DEVICE
43 INPUT/OUTPUT INTERFACE
44 WIRELESS COMMUNICATION DEVICE
111 TRAVELING CONDITION DATA GENERATION UNIT
112 SPECIFIC AREA DATA ACQUISITION UNIT
113 ABNORMAL DATA ACQUISITION UNIT
114 POSITION DATA ACQUISITION UNIT
115 SWITCHBACK COMMAND UNIT
411 OPERATION CONTROL UNIT
412 ABSOLUTE POSITION DATA ACQUISITION UNIT
CR CRUSHER
DPA DISCHARGING PLACE
HL CONVEYING PATH
IS INTERSECTION
LPA LOADING PLACE
PA WORKPLACE
RP TARGET TRAVELING ROUTE
RPA FIRST TRAVELING ROUTE
RPB SECOND TRAVELING ROUTE
SA SPECIFIC AREA

The invention claimed is:

1. A management system for a work vehicle dump truck traveling unmanned, comprising:
a processor configured:
to set traveling condition data including a first traveling route for making a dump truck traveling unmanned travel from a discharging place toward a loading place with forward movement and a second traveling route for making the dump truck travel from the loading place toward the discharging place with backward movement, in a conveying path leading to the loading place and the discharging place where an operation of the dump truck is performed, the first route being a different route from the second route;
to acquire specific area data indicating a plurality of specific areas where the dump truck is able to switch back in the conveying path;
to acquire position data of the dump truck by a global navigation satellite system (GNSS); and
to output a command signal for performing a switchback for changing, without changing a front and rear direction of the dump truck, a moving direction of the dump truck traveling on one of the first traveling route and the second traveling route, and making the work vehicle dump truck travel on the other of the first traveling route and the second traveling route, wherein the processor is configured to switch back the dump truck at a specific area selected from the plurality of specific areas, which is closest to the dump truck based on the position data of the dump truck so that the dump truck switches from travel on the first route with forward movement to the second route with backward movement without changing a front and rear direction of the dump truck.

2. The management system for a dump truck according to claim 1,
wherein a traveling performance of the dump truck at a time of forward movement is substantially identical to a traveling performance of the dump truck at a time of backward movement.

3. The management system for a dump truck according to claim 1,
wherein the dump truck has an obstacle sensor at each of a front portion and a rear portion, and is configured to detect an obstacle at the time of forward movement and at the time of backward movement.

4. The management system for a dump truck according to claim 1,
wherein the specific area includes an intersection of the conveying path.

5. The management system for a dump truck according to claim 1, comprising:
a computer input device configured to generate the specific area data by being operated,
wherein the processor is configured to acquire the specific area data from the computer input device.

6. The management system for a dump truck according to claim 1,
wherein the processor is configured to switch back the dump truck a plurality of times in the conveying path and make the dump truck travel to the loading place and the discharging place.

7. The management system for a dump truck according to claim 1, wherein the processor is further configured to acquire abnormal data of the loading place and the discharging place indicating an abnormal operating condition at the loading place or the discharging place,
wherein the processor is configured to switch back the dump truck based on the abnormal data.

8. The management system for a dump truck according to claim 7, wherein the abnormal operating condition comprises a failure or malfunction of a loading machine at the loading place, or a failure or malfunction of a crusher at the discharging place.

9. The management system for a dump truck according to claim 1, wherein the specific area comprises an intersection between the first traveling route and the second traveling route which allow travel in opposite directions in the conveying path.

10. A management method for a dump truck traveling unmanned, comprising:
setting traveling condition data including a first traveling route for making a dump truck traveling unmanned travel from a discharging place toward a loading place with forward movement and a second traveling route for making the dump truck travel from the loading place toward the discharging place with backward movement, in a conveying path leading to a workplace the loading place and the discharging place where an operation of the dump truck is performed, the first route being a different route from the second route;
acquiring specific area data indicating a plurality of specific areas where the dump truck is able to switch back in the conveying path;
acquiring position data of the dump truck by a global navigation satellite system (GNSS); and
outputting a command signal for performing a switchback for changing, without changing a front and rear direction of the dump truck, a moving direction of the dump truck traveling on one of the first traveling route and the second traveling route, and making the dump truck travel on the other of the first traveling route and the second traveling route,
wherein the switch back is to be performed by the dump truck at a specific area selected from the plurality of specific areas, which is closest to the dump truck based on the position data of the dump truck so that the dump truck switches from travel on the first route with forward movement to the second route with backward movement without changing a front and rear direction of the dump truck.

11. The management method for a dump truck according to claim 10, further comprising:
acquiring abnormal data of the workplace indicating an abnormal operating condition at a loading place or the discharging place,
wherein the switch back is to be performed by the dump truck at a specific based on the abnormal data.

12. The management method for a dump truck according to claim 11, wherein the abnormal operating condition comprises a failure or malfunction of a loading machine at the loading place, or a failure or malfunction of a crusher at the discharging place.

13. The management method for a dump truck according to claim 10, wherein the specific area comprises an intersection between the first traveling route and the second traveling route which allow travel in opposite directions in the conveying path.

* * * * *